Oct. 28, 1930.  R. C. SYLVANDER ET AL  1,779,783
SPEED INDICATOR
Filed Oct. 19, 1922  2 Sheets-Sheet 1

Oct. 28, 1930.   R. C. SYLVANDER ET AL   1,779,783
SPEED INDICATOR
Filed Oct. 19, 1922    2 Sheets-Sheet 2
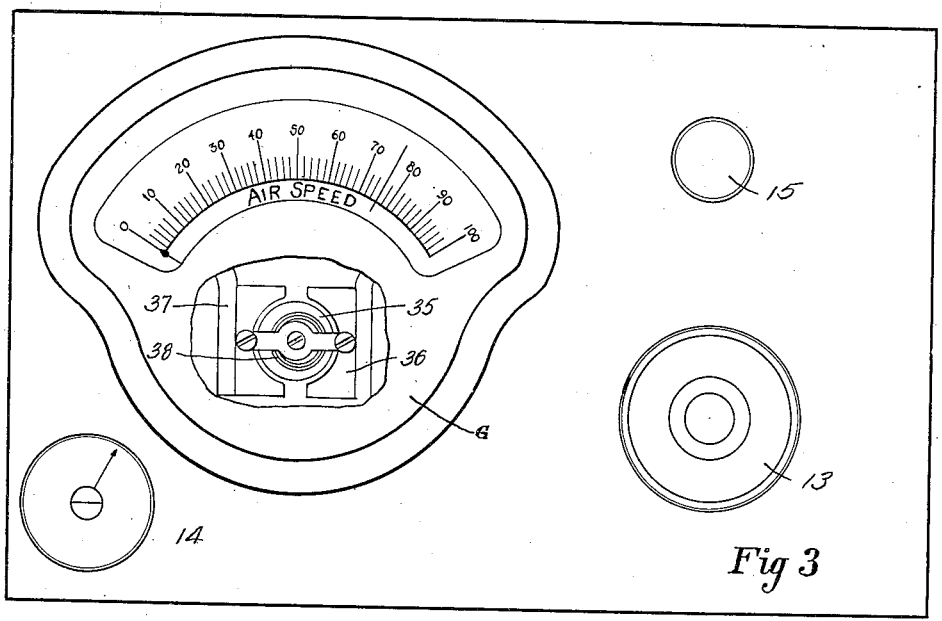
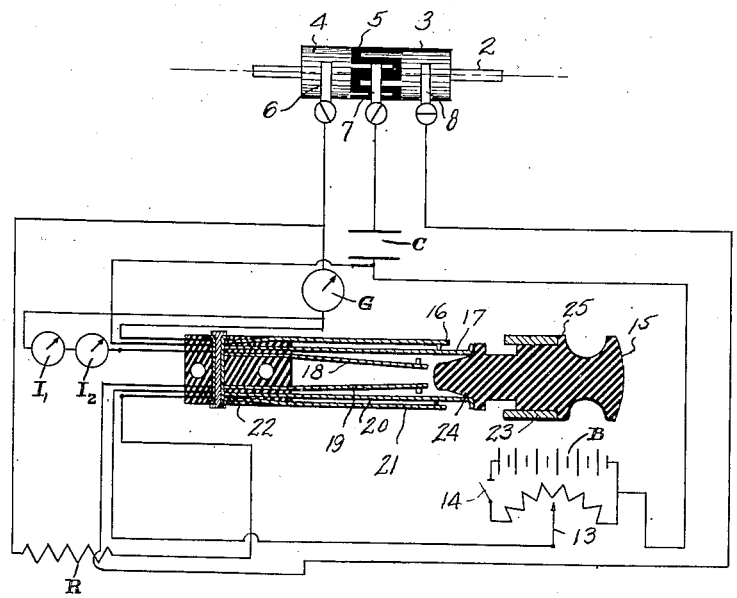

Patented Oct. 28, 1930

1,779,783

UNITED STATES PATENT OFFICE

ROY C. SYLVANDER, OF WASHINGTON, DISTRICT OF COLUMBIA; HERBERT N. EATON, OF CHEVY CHASE, MARYLAND; AND WALTER A. MacNAIR, OF HOUGHTON, MICHIGAN

SPEED INDICATOR

Application filed October 19, 1922. Serial No. 595,695.

This invention relates to speed indicators and more particularly to such in which an impedance is periodically charged and discharged through a galvanometer or the like to give a reading proportional to the magnitude of such periodicity.

Heretofore such systems in their simplest form as applied to revolution counters or the like have been found impracticable. This has been principally due to the fact that the source of E. M. F. to bring about the periodical charging is apt to vary of itself with a consequent source of inaccuracy in the readings. On the other hand where such variability in potential magnitude has been automatically corrected for it has necessitated the use of a freely suspended needle actuating member which makes such type of instrument and method of correction completely unsuitable for aircraft or the like where vibrations and accelerations are normal occurrences.

In connection with aircraft be it said a device has been needed which will particularly measure relatively low air speeds of the order of 10 miles per hour. The problem of higher speed has never offered any material difficulty, since such latter instruments are either acted on directly by the anemometer drive or indirectly by means of an electrical tachometer generator or the like.

We have discovered that the reason why such types of instruments fail on the lower air speed above indicated is primarily because too much energy needs to be drawn from the air for the operation of the instrument. With the practical air space then allotable for such drive, the slip of the anemometer cups or fan blade closely approaches 100%, with a consequent source of inaccuracy in the drive speed due to eddying or airwash unavoidably set up about the air craft when in normal operation.

The above discovery therefore has led us to devise a type of instrument in which the slip of the anemometer drive shall in contradistinction be nearer to 0%. However because the amount of energy available then becomes practically zero such drive is employed rather to operate a commutator control of an energy source than to give rise to the energy required for operating the instrument. It is the commutated source which supplies all the power necessary to give the actual indications. A spring restrained needle requiring a large amount of power can then be employed. Steadiness and accuracy are thus assured despite the fact that the air drive itself is necessarily small because of lack of bulkiness. Moreover readings are practically independent of altitude variation.

In its broadest aspect therefore the invention comprises an airspeed indicator for aircraft or the like in which a practically slip-free and air wash-free anemometer is employed to drive a commutating energy charge and discharge device for an indicating instrument.

A second feature of the invention includes also a simple push button system, or its equivalent, which enables the pilot to check quickly the accuracy of the indications given with the least amount of attention or effort. In conjunction with such checking button or switch there is an additional feature for making the necessary correcting adjustments with the least amount of apparatus involved. To this end be it observed the galvanometer is made to serve a double purpose since during the course of correction the galvanometer (milliameter or the like) is made to act as a voltage indicator for the source of actuating E. M. F.

For a better understanding of the invention the following figures of the drawing are annexed:

Figure 2 illustrates a switching scheme alternative to the wiring system shown in Figure 1.

Figure 4:
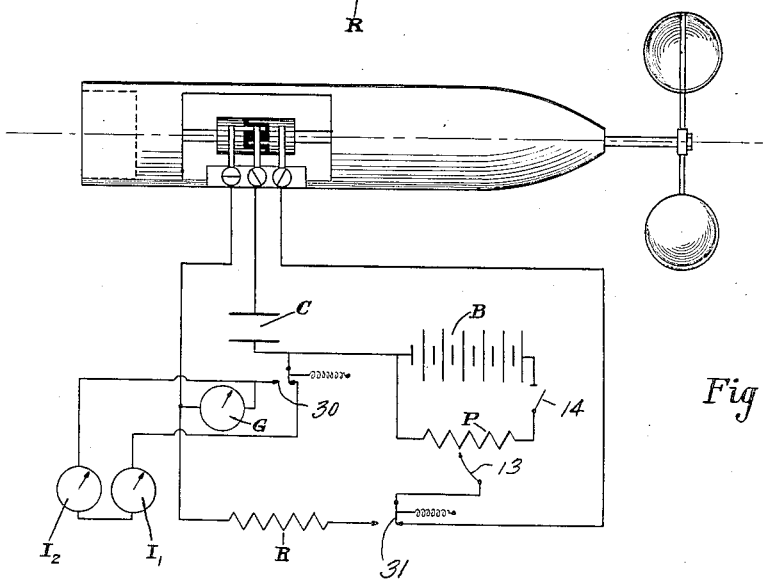

Figure 3 illustrates the panel arrangement conformable to the representation of Fig. 2 and Figure 4 comprises a wiring diagram according to the showing of Fig. 2 but with the knob switch 15 of Fig. 2 split up into the two simultaneously operated switches 30 and 31.

Figure 1:
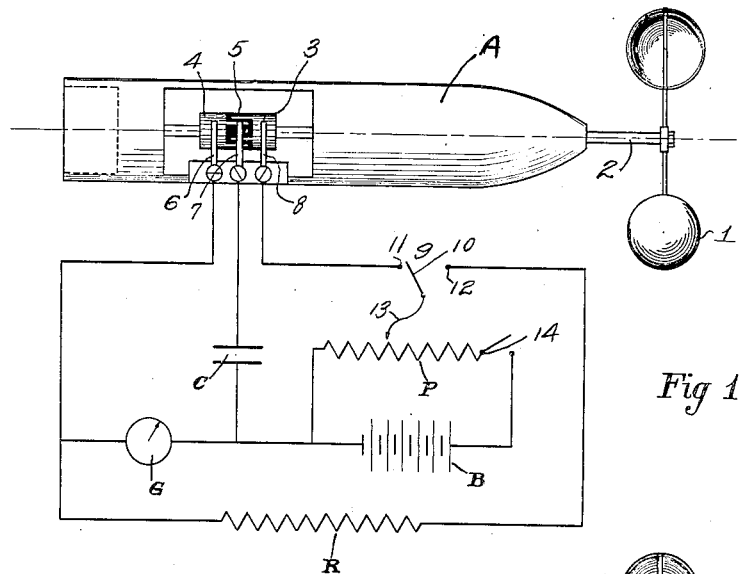
Figure 1 represents a wiring diagram of the air speed indicator.

Referring more particularly to the drawings, it will be seen in the modification shown in Fig. 1, an anemometer A is provided with highly polished metal cups 1 to turn the shaft 2. A commutator device is mounted upon shaft 2 and is made up of three segments 3, 4, and 5. The two metal segments 3 and 4 are insulated from each other by the segment 5. Three brushes 6, 7, and 8 bear on the commutator device, brushes 6 and 8 bearing on segments 4 and 3 and brush 7 bearing alternately on segments 3 and 4.

Brush 6 is connected to one terminal of the galvanometer or milliameter G. Brush 7 is connected to the condenser C. The other terminal of the galvanometer C is connected to the opposite side of condenser C. A battery B has one pole connected to both the galvanometer and condenser and the other pole connected through a potentiometer P and a double throw switch 9 to the brush 8. The double throw switch 9 has the switch blade 10 and the contact points 11 and 12. When the switch blade is on point 11, the battery is connected to the brush 8. When the switch blade is thrown over on contact point 12 the galvanometer is shunted across the battery through the resistance R and the potentiometer P. The potentiometer is provided with an adjustable contact 13 and the battery circuit is closed by a switch 14.

In operation the switch blade 10 is thrown to the right on contact 12 in order to determine whether the potentiometer E. M. F. available for charging the condenser C is of a definite magnitude. By shunting the battery across the galvanometer in this manner the needle will have a certain throw or deflection. Should the battery be weak, for example, the adjustable contact 13 is moved on the potentiometer P to such a position as to bring the needle of the galvanometer, now acting as a voltmeter, to a certain definite or standardizing deflection. This preliminary adjustment of the voltage of the battery removes any chance of error due to variations in the E. M. F. applied to the charging condenser. After such adjustment of the potentiometer, the switch blade is thrown on contact 11 and the device now operates as a speed indicator. The rotation of the shaft 2 causes the commutator to periodically charge and discharge the condenser C. Since the resistance R is now removed from the circuit, the galvanometer G acts as a milliameter. Inasmuch as the discharging period of the condenser is sufficiently small in comparison to the make-and-break period of the commutator, the deflection of the galvanometer needle will be proportional to the number of revolutions of the anemometer drive. Clearly to this end, it is preferable on high speds to have a potentiometer as devoid of self induction as possible.

Turning to the modification shown in Fig. 2, it will be seen that an arrangement is disclosed whereby several indicating instruments $I_1$ and $I_2$ are placed in series with the galvanometer G. The instruments $I_1$ and $I_2$ are identical to the galvanometer G but they are not capable of being used to test the E. M. F. of the battery B. These additional instruments are placed in different parts of an airplane so that the several observers or pilots can note the air speed of the airplane and yet not be misled by the initial adjustment of potentiometer and mistake these test deflections of the galvanometer as actual air speed readings. To this end a novel switch arrangement is utilized which will only cut into circuit the instruments $I_1$ and $I_2$ when air speed readings are desired. A series of spring switch points 16 to 21 inclusive are mounted in an insulating block 22. The points 17 and 20 are longer than the others and cooperate with the wedge-shaped part 24 of the switch button 15 to form a double-throw switch. The circuit with the switch positioned as shown in Fig. 2 places the galvanometer and the other indicating instruments in series and the device operates as a speed indicator. The circuit is traced as follows: the brush 6 is connected to one terminal of galvanometer G and the two instruments $I_1$ and $I_2$ are in series with the galvanometer, the terminal of instrument $I_2$ is connected to spring point 18 which has a contact with spring point 17 which in turn is connected through the condenser C to brush 7. Condenser C is also connected to one terminal of the battery through the potentiometer. The adjustable contact of the potentiometer is connected to spring contact 20, which contacts with spring contact 19. The spring contact 19 leads back to brush 8.

The switch button 15 is mounted in a guideway 23 and when the button is pushed in as far as shoulder 25, the wedge-shaped part 24 breaks the contacts between points 17 and 18 and 19 and 20 respectively and closes the circuit through points 16 and 17 and 20 and 21 respectively. In such a position the instruments $I_1$ and $I_2$ are cut out of the circuit and the resistance R is shunted across the galvanometer G and the battery B.

Fig. 3 shows the panel arrangement for the circuit shown in Fig. 2. More particularly it shows the construction of the galvanometer G which is of the ordinary movable coil type. The armature 35 moves in the field formed by the permanent magnet 36. The armature 35 carries the pointer 37 and is spring-retained by coil spring 38.

Fig. 4 shows the same circuit as described and shown in Fig. 2. The difference lies in the substitution of two switches 30 and 31 for the switch 15. With switches 30 and 31 in the position shown the instruments G, I, and $I_2$ are in series and operate as speed indicators. When the switches 30 and 31 are thrown to the left, the galvanometer G is shunted across the battery and potentiometer through the resistance R. Switches 30 and 31 are preferably interlocked and spring-pressed and biased in the position shown in the figure.

In particular it should be mentioned, especially in connection with aircraft where the navigator has very little time to apply to any one instrument observation, that the switches 15 and 13 are so conveniently arranged by the inventors that the knob 13 (preferably of larger size) automatically locates the required pointer for the index finger with which to operate the push button switch 15 or the like. The distances between the two switches (see Fig. 3) 15 and 13 should therefore be such that having the index finger on the push button switch the remainder of the hand is available for turning the potentiometer knob 13. A dual single hand control is therefore afforded by this simple expedient.

Having disclosed the nature of our invention, what we claim is:

1. A speed indicator comprising a source of electromotive force, a galvanometer means, means for periodically absorbing energy from said source and discharging said energy into said galvanometer means, and further means for testing the voltage of said source and further means for adjusting the voltage to said galvanometer means.

2. A speed indicator comprising a source of electromotive force, a galvanometer means, capacitive means for periodically absorbing energy from said source and discharging said energy into said galvanometer means and potentiometer means for adjusting the voltage to said galvanometer means.

3. A speed indicator comprising, a source of electromotive force, a galvanometer means, means for periodically absorbing energy from said source and discharging said energy into said galvanometer means, and further means for testing the voltage of said source and potentiometer means for adjusting the voltage to the said galvonometer means.

4. A speed indicator comprising a source of electromotive force, a galvanometer means, means for periodically absorbing energy from said source and discharging said energy into said galvanometer means, and further means for using the galvanometer for testing the voltage of said source and further means for including a resistance in series with the galvanometer when testing the voltage of said source.

5. A speed indicator comprising, a source of electromotive force, a galvanometer means, means for periodically absorbing energy from said source and discharging said energy into said galvanometer means, and further means for testing the voltage of said source and a further means for including a resistance in series with the galvanometer of said galvanometer means when testing the voltage of said source and a potentiometer means for adjusting the voltage to the said galvanometer means.

In testimony whereof we have affixed our signatures.

ROY C. SYLVANDER.
HERBERT N. EATON.
WALTER A. MacNAIR.